United States Patent
Yang et al.

(10) Patent No.: US 10,705,682 B2
(45) Date of Patent: Jul. 7, 2020

(54) SECTIONAL USER INTERFACE FOR CONTROLLING A MOBILE TERMINAL

(71) Applicant: Samsung Electronics Co., Ltd., Gyeonggi-do (KR)

(72) Inventors: Hui Chul Yang, Seoul (KR); Jee Yeun Wang, Seoul (KR); Joong Hun Kwon, Seoul (KR); Yu Sic Kim, Sanggye-dong (KR); Kyu Sung Kim, Seoul (KR); Sun Young Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1008 days.

(21) Appl. No.: 14/821,908

(22) Filed: Aug. 10, 2015

(65) Prior Publication Data

US 2015/0346925 A1 Dec. 3, 2015

Related U.S. Application Data

(63) Continuation of application No. 13/367,688, filed on Feb. 7, 2012, now Pat. No. 9,104,290.

(Continued)

(30) Foreign Application Priority Data

Jun. 20, 2011 (KR) .......................... 10-2011-0059539

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0481* (2013.01); *G06F 3/0488* (2013.01);
(Continued)

(58) Field of Classification Search
CPC .. G06F 3/0482; G06F 3/04817; G06F 3/0488; G06F 3/04842; G06F 3/0481;
(Continued)

(56) References Cited

U.S. PATENT DOCUMENTS

| 5,487,143 A | 1/1996 | Southgate |
| 5,720,016 A | 2/1998 | Egashira |

(Continued)

FOREIGN PATENT DOCUMENTS

| CN | 1976389 A | 6/2007 |
| CN | 101169700 A | 4/2008 |

(Continued)

OTHER PUBLICATIONS

Chinese Notice of Allowance, dated May 5, 2016.

*Primary Examiner* — Nicholas Ulrich
(74) *Attorney, Agent, or Firm* — Cha & Reiter, LLC

(57) ABSTRACT

A method for controlling a screen of a mobile terminal that simultaneously displays a plurality of execution screens is provided. The method preferably includes: displaying a layout composed of a plurality of sections when a magazine creation event is sensed; mapping applications to the plurality of sections in a one-to-one correspondence, respectively to create a magazine; and displaying the magazine, and an execution screen of an application mapped to each of the sections is arranged at the magazine.

19 Claims, 8 Drawing Sheets

Related U.S. Application Data

(60) Provisional application No. 61/463,043, filed on Feb. 11, 2011.

(51) Int. Cl.
  *G06F 3/0484* (2013.01)
  *G06F 3/0481* (2013.01)
  *G09G 5/14* (2006.01)
  *G06F 9/451* (2018.01)

(52) U.S. Cl.
  CPC ...... *G06F 3/04817* (2013.01); *G06F 3/04842* (2013.01); *G06F 9/451* (2018.02); *G06F 2203/04803* (2013.01); *G09G 5/14* (2013.01); *G09G 2340/02* (2013.01)

(58) Field of Classification Search
  CPC ........... G06F 9/451; G06F 2203/04803; G06F 3/0483; G06F 3/04886; G09G 2340/02; G09G 5/14
  See application file for complete search history.

(56) References Cited

U.S. PATENT DOCUMENTS

| | | | |
|---|---|---|---|
| 6,008,809 A | 12/1999 | Brooks | |
| 6,310,631 B1 | 10/2001 | Cecco et al. | |
| 7,561,899 B2 | 7/2009 | Lee | |
| 8,704,777 B2* | 4/2014 | Small | H04N 1/00127 345/1.3 |
| 2005/0108655 A1 | 5/2005 | Andrea et al. | |
| 2005/0188329 A1 | 8/2005 | Cutler et al. | |
| 2005/0235220 A1 | 10/2005 | Duperrouzel et al. | |
| 2006/0015818 A1* | 1/2006 | Chaudhri | G06F 3/0481 715/779 |
| 2006/0190833 A1 | 8/2006 | SanGiovanni et al. | |
| 2007/0050724 A1 | 3/2007 | Lee et al. | |
| 2007/0101297 A1* | 5/2007 | Forstall | G06F 3/04817 715/841 |
| 2007/0192726 A1 | 8/2007 | Kim et al. | |
| 2007/0245263 A1* | 10/2007 | Hale | G06F 9/451 715/810 |
| 2008/0235602 A1* | 9/2008 | Strauss | G06F 9/451 715/762 |
| 2009/0031247 A1* | 1/2009 | Walter | G06F 9/451 715/788 |
| 2009/0203408 A1 | 8/2009 | Athas et al. | |
| 2009/0228824 A1 | 9/2009 | Forstall et al. | |
| 2010/0217809 A1 | 8/2010 | Vymenets et al. | |
| 2010/0299436 A1* | 11/2010 | Khalid | G06F 1/1643 709/226 |
| 2010/0299597 A1 | 11/2010 | Shin et al. | |
| 2010/0312817 A1 | 12/2010 | Steakley | |
| 2010/0313154 A1 | 12/2010 | Choi et al. | |
| 2011/0012930 A1 | 1/2011 | Davis et al. | |
| 2011/0175930 A1* | 7/2011 | Hwang | G06F 3/0481 345/629 |
| 2011/0185283 A1* | 7/2011 | Jun | H04M 1/72572 715/745 |
| 2011/0320939 A1* | 12/2011 | Hand | G06F 3/04817 715/702 |
| 2012/0015693 A1* | 1/2012 | Choi | H04M 1/72566 455/566 |
| 2012/0020428 A1* | 1/2012 | Roth | G08C 17/02 375/295 |
| 2012/0159382 A1* | 6/2012 | Matthews | G06F 3/0481 715/788 |
| 2013/0184598 A1 | 7/2013 | Bowe et al. | |

FOREIGN PATENT DOCUMENTS

| | | |
|---|---|---|
| EP | 2 194 451 A2 | 6/2010 |
| EP | 2 227 005 A2 | 9/2010 |
| KR | 10-0654490 B1 | 12/2006 |
| WO | 99/26127 A1 | 5/1999 |
| WO | 2007/061827 A2 | 5/2007 |

\* cited by examiner

SECTIONAL USER INTERFACE FOR CONTROLLING A MOBILE TERMINAL

CROSS REFERENCE TO RELATED APPLICATIONS

This is a Continuation application of U.S. patent application Ser. No. 13/367,688 filed on Feb. 7, 2012 which claims the benefit of priority under 35 U.S.C. § 119(e) based on U.S. provisional application No. 61/463,043 filed in the USPTO on Feb. 11, 2011, and under 35 U.S.C. § 119(a) based on Korean Patent Application No. 10-2011-0059539 filed in the Korean Intellectual Property Office on Jun. 20, 2011, the entire contents of both documents being incorporated by reference in its entirety.

BACKGROUND

Field of the Invention

The present invention relates to a method for controlling a screen of a mobile terminal. More particularly, the present invention relates to a method for controlling a screen of a mobile terminal that displays multiple applications and a screen for execution.

Description of the Related Art

A market for mobile terminals has been rapidly growing due to various innovations in designs, as well as applications stimulating purchase. In particular, unlike an existing mobile phone using only given functions, a smart phone may download and install various applications from on-line markets. Such a mobile terminal may provide a multi-tasking simultaneously performing various tasks. For example, a user may perform web surfing while listening to the music, and receive a reception guide including metadata about a program while watching a movie.

Accordingly, the mobile terminal requires an interface technology such that a user may rapid approach a corresponding application of a desired task. In order to provide such an interface technology, the mobile terminal generally includes a touch screen. Further, the mobile terminal divides a display region into a main region and a sub region. One executed application execution screen is disposed on the main region. Icons of other executed applications and icons of favorite applications of a user are disposed at the sub region to increase accessibility with respect to applications.

However, the interface technology merely provides accessibility but does not present a method that allows a user to view a plurality of application execution screens in a substantially simultaneously manner.

SUMMARY

The present invention provides a method for controlling a screen of a mobile terminal that permits a user to simultaneously view a plurality of application execution screens.

In accordance with an exemplary aspect of the present invention, a method for controlling a screen of a mobile terminal preferably includes: displaying a layout composed of a plurality of sections when a magazine creation event is sensed; mapping applications to the plurality of sections in a one-to-one correspondence, respectively to create a magazine; and displaying the magazine. An execution screen of an application mapped to each of the sections is arranged at the magazine.

Displaying a layout preferably includes displaying one selected by a user from among a plurality of layouts having different locations of a section.

Mapping applications preferably includes: displaying an application list when one is selected from the plurality of sections; mapping the selected application to the selected section when one application is selected from the application list; and displaying an application icon preferably above the selected section to indicate the selected application. Displaying the magazine preferably includes: displaying one of a plurality of magazines when a magazine display event is sensed; and changing the displayed magazine to another magazine when a magazine change event is sensed.

In accordance with an exemplary aspect of the present invention, a method for controlling a screen of a mobile terminal preferably includes changing at least one of the plurality of applications to another application when a magazine edit event is sensed while displaying the magazine.

As disclosed above and herein below, in a method for controlling a screen of a mobile terminal according to the present invention, a user may simultaneously view a plurality of application execution screens.

BRIEF DESCRIPTION OF THE DRAWINGS

The exemplary objects, features and advantages of the present invention will become more apparent to a person of ordinary skill in the art from the following detailed description in conjunction with the accompanying drawings, in which.

DETAILED DESCRIPTION

A method for controlling a screen of a mobile terminal according to exemplary embodiments of the present invention is described with reference to the accompanying drawings in more detail herein below. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

As used herein, the term "application execution screen" is distinguished from an icon, which refers to a graphic displayed on a screen when a corresponding application is executed. As used herein, the term "magazine" refers to a screen shown on a display unit of a mobile terminal. The magazine is divided into a plurality of sections, and an application execution is arranged in each of the sections. As used herein, the term "layout" is a screen displayed on a display unit of a mobile terminal, which refers to an arranged form of a plurality of sections. A user may create and edit a magazine through the layout. As used herein, the term "mapping" refers to a procedure connecting an application to a section when a layout is displayed. As used herein, the term "widget" refers to a mini application. That is, as generally known by persons of ordinary skill in the art, the widget is a mini application that permits a user to directly use contents or functions without using an application. A mini-application such as weather, calendar, calculator, or news may comprise a widget. In the art, a widget is distinguished from an "app" because a widget is always running. Web widgets are stand alone mini-applications that are sharable and can run on any web page as long as you have an internet connection and a browser. In contrast, a conventional application, which is not a widget, requires you to click on the application's icon to open and run it. You then close the application when finished. Hereinafter, it is appreciated that a mini-application is concept including the widget, as there is a degree of overlap.

A mobile terminal according to an exemplary embodiment of the present invention is a terminal including a touch screen. A person of ordinary skill in the art should appreciate that the mobile terminal exemplified in the present invention is representative of various information communication devices and multi-media devices such as MP3 player, Portable Multimedia Player (PMP), Personal Digital Assistant (PDA), tablet PC, portable phone, Smart Phone, and application thereof, just to name a few possibilities. Hereinafter, it is assumed that the mobile terminal is a smart phone.

Figure 1:
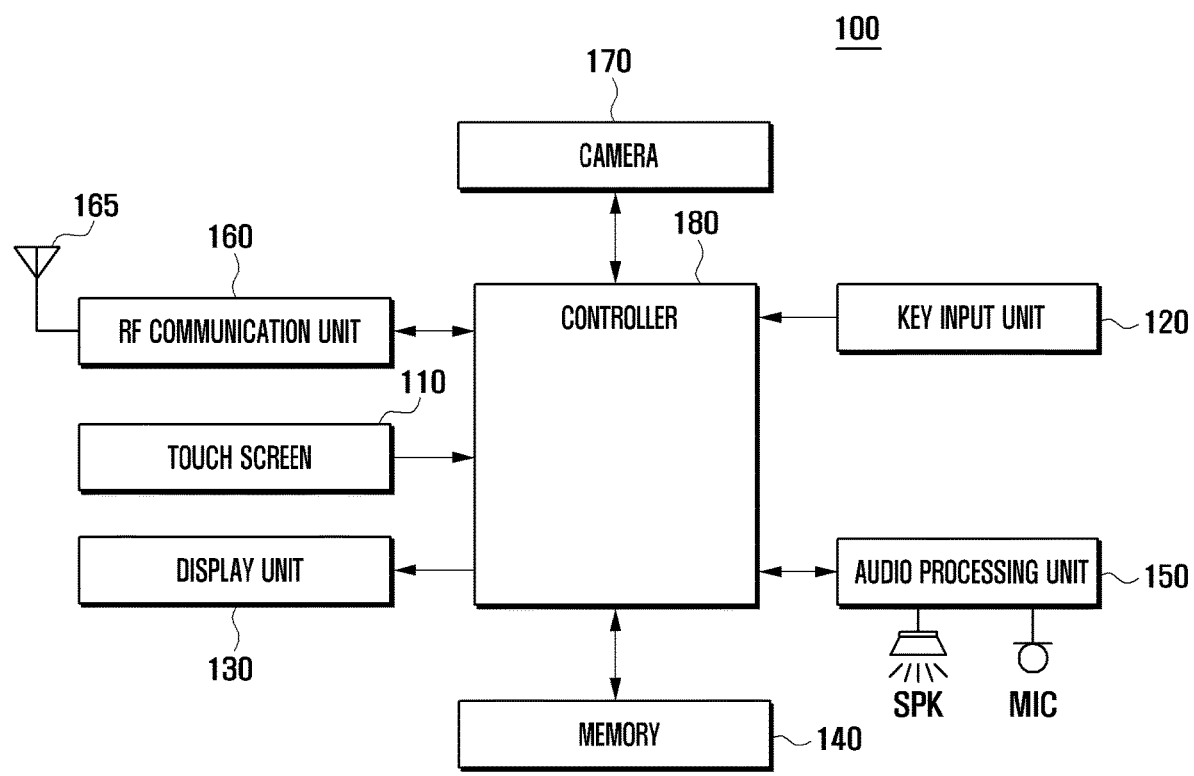
FIG. 1 is a block diagram illustrating a configuration of a configuration of a mobile terminal according to an exemplary embodiment of the present invention.

FIG. 1 is a block diagram illustrating a configuration of a configuration of a mobile terminal according to an exemplary embodiment of the present invention.

Referring now to FIG. 1, a mobile terminal 100 according to an exemplary embodiment of the present invention may include a touch screen 110, a key input unit 120, a display unit 130, a memory 140, an audio processing unit 150, a radio frequency (RF) communication unit 160, a camera 170, and a controller 180.

The touch screen 110 transfers detection of a touch event to the controller 180. The touch event may be divided into Touch & Drop, Drag & Drop, and Flick & Drop, etc. according to its operation. Here, the touch & drop refers to an operation of pushing one point displayed on the touch screen with a finger and then separating the finger from the point. The drag & drop typically refers to an operation of moving a finger in a certain direction with it pushing one point and then separating the finger from the touch screen. The flick & drop refers to an operation of moving a finger quickly like flipping the finger and then separating the finger from the touch screen. The controller 180 may recognize a flick and drag operation according to a moving speed. Further, the touch & drop operation may be divided into tap and press according to a touch time. That is, tap is an operation separating a finger after shortly touching the finger against the touchscreen. The press refers to a touch operation separating a finger from the touchscreen after relatively touching the finger for a longer period of time.

Further, a touch event according to the present invention may be divided into one of a plurality of events, such as a magazine display event, a magazine creation event, a magazine edit event, a magazine change event, a magazine end event, a layout display event, a layout change event, an icon removal event, and a section control event according to its meanings. Besides this, the touch event may be variously classified according to locations, directions, distances, and pressures. Meanwhile, a resistive type, a capacitive type, or a pressure type display can be used with the touch screen 110.

The key input unit 120 is configured by a plurality of keys for an operation of the mobile terminal 100, and transfers a key signal to the controller 180. They keys may be virtual, and it is within the spirit of the invention that the input unit may constitute an auxiliary input to the touch display, or certain functions, etc. might be associated with the key input. Here, the key signal may be divided into a power on/off signal, a volume control signal, and a screen on/off signal.

With continued reference to FIG. 1, the display unit 130 converts image data input from the controller 180 into an analog signal and displays the analog signal. The display unit 130 of the present invention preferably divides a screen into an indicator region, a main region, and a sub region, and displays time, a residual amount of a battery, and a receiving rate on the indicator region, and displays a main screen and a sub screen on remaining two regions. Here, the main screen may comprise one of a lock screen, a home screen, an application execution screen, a layout, or a magazine. Here, the lock screen generally is an image displayed when a screen of the display unit 130 is enlarged. Further, the home screen is an image including a plurality of icons for executing an application. Meanwhile, the sub screen may be an executed image or an image including a favorite application icon of a user. In the meantime, the sub screen may be configured by a menu for changing display of the main screen.

The memory 140, which is a non-transitory machine readable medium, stores programs and data necessary for an operation of the mobile terminal 100, namely, OS, applications, and data such as images, audios, and videos. Further, the memory 140 preferably includes a main storage unit and a secondary storage unit. Here, the secondary storage unit may be configured by a flash memory and the main storage unit may be configured by a RAM.

The main storage unit preferably comprises a storage space in which an OS and an application are loaded. That is, if the mobile terminal 100 is booted, the OS is executed in a loaded state from the secondary storage unit to the main storage unit. Further, the application is executed in a loaded state from the secondary storage unit to the main storage unit. If execution of a corresponding application is terminated, it is then removed from the main storage unit. Meanwhile, the secondary storage unit is a space that preferably stores the OS, various applications and data. Here, the secondary storage unit may be divided into a data area and a program area. In particular, the data area of the present invention stores various layouts of screen displays. Further, the data area of the present invention stores a plurality of magazines created or edited through the layouts.

As shown in FIG. 1, the audio processing unit 150 performs a function that transmits an audio signal input from the controller 170 to a speaker SPK and transmits audio signals such as voices input from the microphone MIC to the controller 180. That is, the audio processing unit 150 converts voice/sound data into an audible sound through the speaker SPK under the control of the controller 180 and outputs the audible sound. The audio processing unit 150 converts an audio signal such as voices received from the microphone MIC into a digital signal and transfers the digital signal to the controller 180.

The RF communication unit 160 can perform transmission/reception of signals associated with portable phone communication, Short Message Service (SMS), Multimedia Message Service (MMS), a speech call, a videophone call, and data communication. For example, the RF communication unit 160 converts voice/sound data and control data into RF signals, and transmits the RF signals via antenna 165. The RF communication unit 160 receives and converts RF signals into voice/sound data and control data and output the voice/sound data and control data. To do this, the RF communication unit 160 may include an RF transmitter (not shown) up-converting a frequency of a transmitted signal and amplifying the signal, an RF receiver (not shown) for low-noise-amplifying a received signal and down-converting the signal.

The camera 170 captures an image and outputs the captured image to the controller 180. The camera 17 preferably includes a front camera disposed at a front surface of the mobile terminal and a rear camera disposed at a rear surface thereof.

The controller 180, which may be a processor or microprocessor, controls an overall operation of the mobile terminal 100 and signal flow between internal blocks in the mobile terminal 100. In particular, if a lock release event, for example, drag & drop from a left side to a right side is sensed, an image displayed on a screen is converted from a lock screen to a home screen, an application execution screen, or a magazine. If a touch event for any one application icon, for example, tap is sensed, the controller 180 executes a corresponding application and converts an image displayed on a screen from a home screen to an application execution screen. For example, if a user taps an icon for a videophone call, the controller 180 controls the display unit 130 to display a call execution screen on a main screen region. Further, if a magazine display event (e.g., tap for a magazine display button displayed on a sub screen) is sensed, the controller 180 converts an image displayed on a screen from a home screen to a magazine.

In addition, the controller 180 of the present invention performs functions such as creation, edition, and change of the magazine.

An exemplary screen control method of the controller 180 according to the present invention will now be described with reference to FIG. 2 to FIG. 5 in more detail.

Figure 2:
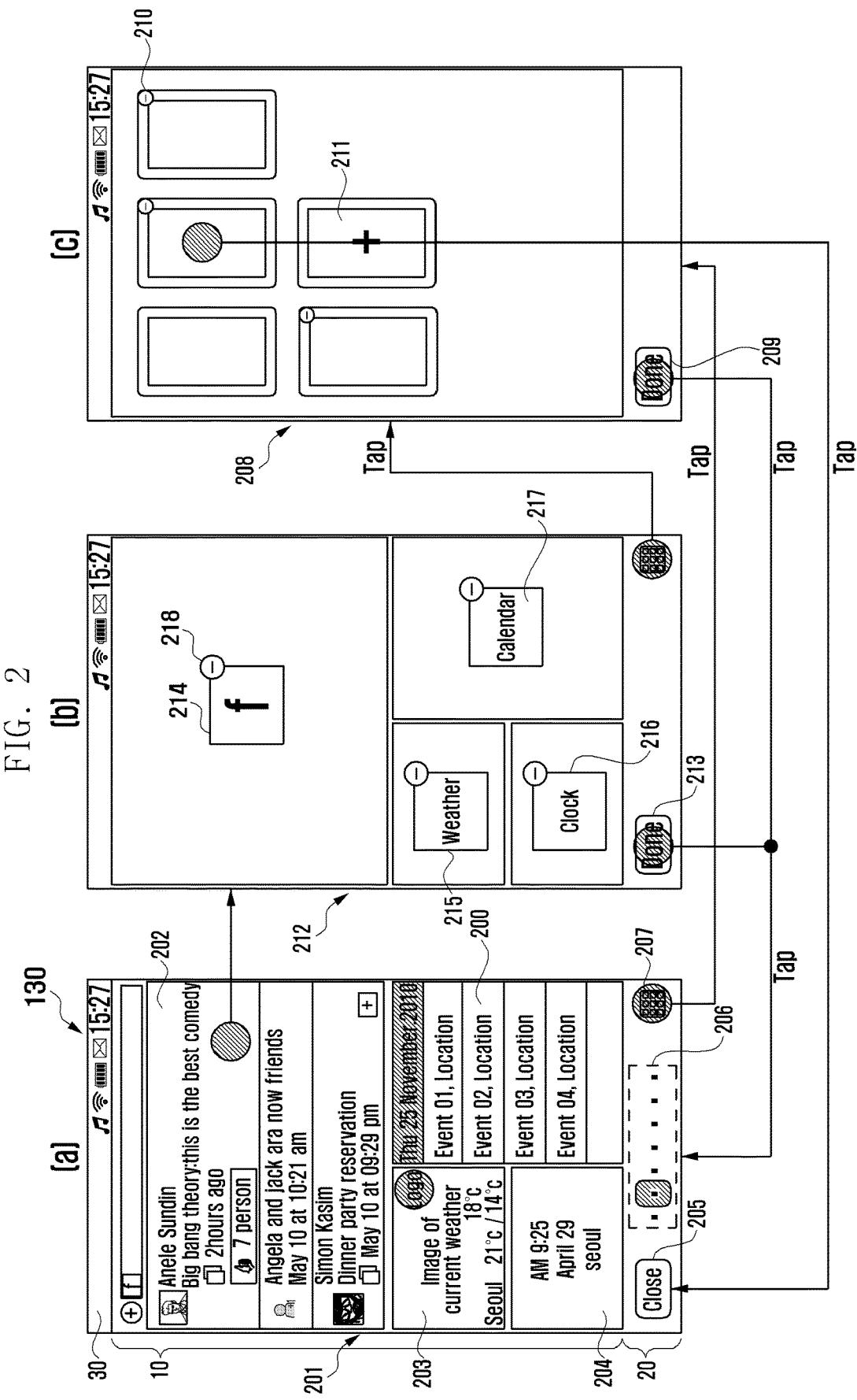
FIG. 2 is a view illustrating an exemplary procedure of changing and editing a magazine according to an exemplary embodiment of the present invention.

FIG. 2 is a view illustrating a procedure changing and editing a magazine according to an exemplary embodiment of the present invention.

Referring now to FIG. 2, a controller 180 controls a display unit 130 (such as shown in FIG. 1) to display a magazine 201 on a main region 10 of the display unit. For example, as shown in FIG. 2(a), the magazine 201 may be composed of a Facebook execution screen 202, a weather screen 203, a clock screen 204, and a calendar screen 200. At this time, the display unit 130 displays a magazine end button 205, a guide 206, and a full view button 207 on a sub region 20 of the display unit 130.

If a magazine end event (e.g., tap 205 for a magazine end button 205) is sensed on the sub region 20, the controller 180 controls the display unit 130 to display a home screen instead of the magazine 201 on the main region 10, or to display entire screens except for an indicator region 30. Here, when a home screen is displayed on the main region 10, executed icons or favorite application icons may be displayed on the sub region 20. Meanwhile, the guide 206 guides a total number of magazines and a relative location of a currently displayed magazine 201 to a user.

If a full magazine view event (e.g., tap for full view button 207) is sensed at the sub region 20, the controller 180 converts a screen from the magazine 201 to a full magazine view screen 208 2(c). That is, the display unit 130 converts all magazines into icons and displays the icons on the main region 10. At this time, the display unit 130 displays a full view end button 209 on the sub region 20. If the user touches & drops the full view end (done) button 209, a touch screen 110 transfers a touch screen associated therewith to the controller 180, and the controller 180 senses termination of the full magazine view.

Accordingly, the display unit 130 displays a magazine 201 on a main region 10 and displays a magazine end button 205, a guide 206, and a full view button 207 on a sub region 20 (FIG. 2(a). Further, if a user taps one of the icons, the controller 180 senses the tap and controls the display unit 130 to display a magazine corresponding to the particular tapped icon on the main region 10. If a user presses one of the icons, (rather than taps) the controller 180 controls the display unit 103 to display a magazine removal button 210 preferably arranged above all of the displayed icons. If the user taps the magazine removal button 210 (FIG. 2(c), the controller 180 removes a corresponding icon and magazine. If the user drags & drops one of the icons to an outside of a screen, the controller 180 may remove a corresponding icon and magazine. Meanwhile, the display unit 130 displays a magazine creation button 211 on the main region 10.

In the meantime, if a magazine change event is sensed, for example, flick & drop for a magazine 201, the controller 180 controls the display unit 130 to display another magazine.

Moreover, when a magazine edit event, for example, press for a magazine 201 is sensed, the controller 180 controls the display unit 130 to display a layout 212 of the magazine 201 on a main region 10 and a full view button 207 and an edit end button 213 on the sub region 20. If tap for the full view button 207 is sensed, the controller 180 converts a screen from a layout 212 to a full magazine view screen 208. Further, if tap for an edit end button 213 is sensed, the controller 180 converts a screen from the layout 212 to a magazine 201. As shown in FIG. 2(b), a Facebook™ icon 214, a weather icon 215, a clock icon 216, and a calendar icon 217 are disposed at each section of the layout 212. Further, an icon removal button is displayed on each icon. If a user taps the icon removal button 218, the controller 180 removes a corresponding icon and release mapping between a corresponding section and an application. As illustrated above, a new application may be mapped to a section from which the icon is removed, and a detailed description thereof will be given with reference to FIG. 3 and FIG. 4.

Figure 3:
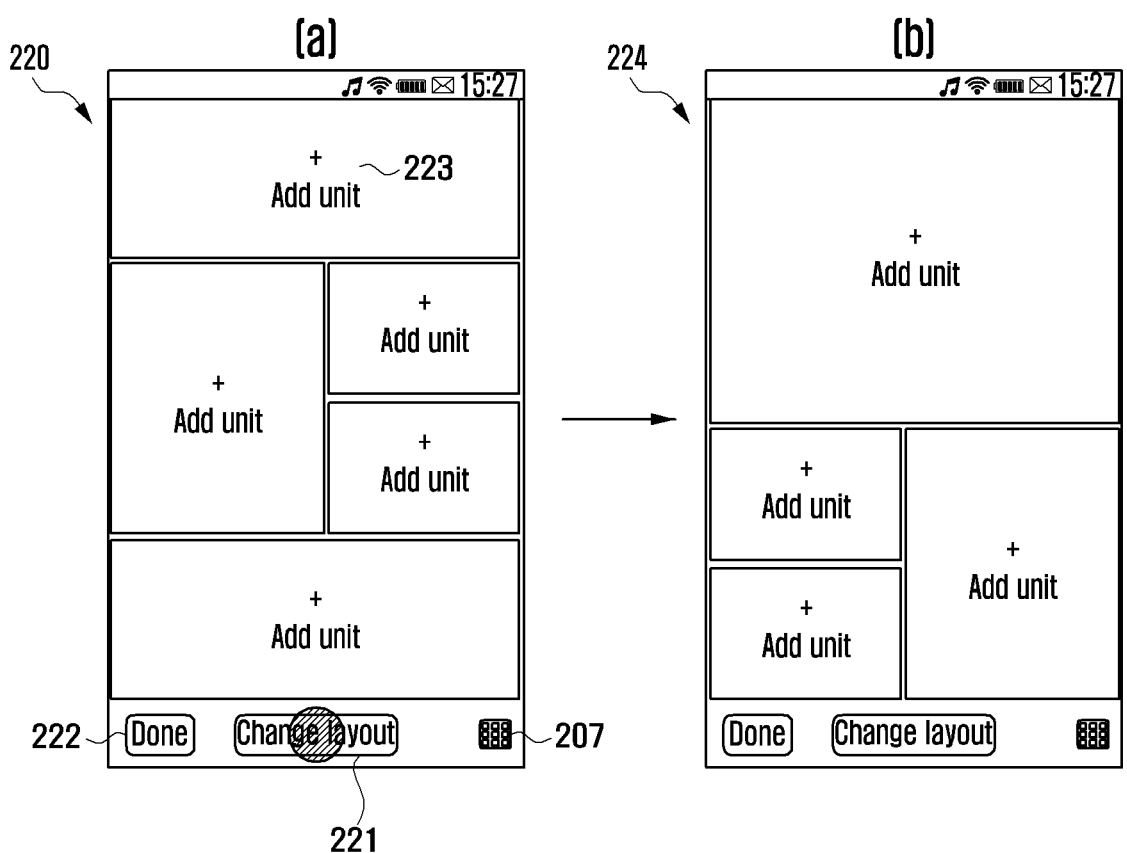
FIG. 3 is a view illustrating an example of a layout change procedure according to an exemplary embodiment of the present invention.

FIG. 3 is a view illustrating an example of a layout change procedure according to an exemplary embodiment of the present invention.

Referring now to FIG. 3, when a tap at the touchscreen for a magazine creation event, for example, a magazine creation button 211 of FIG. 2(c) is sensed, a controller 180 controls a display unit 130 to display in FIG. 3(a) a layout 220 on a main region 10 and display a full view button 207, a layout change button 221, and a creation end button 222 on a sub region 20. Further, the controller 180 controls the display unit 130 to display a mapping button 223 above each section of the layout 220. If a layout change event, for example, tap for a layout change button 221 or flick & drop for the layout 220 is sensed, the controller 180 controls the display unit 130 to display a layout 224 having a different location of a section (FIG. 3(*b*)).

Figure 4:
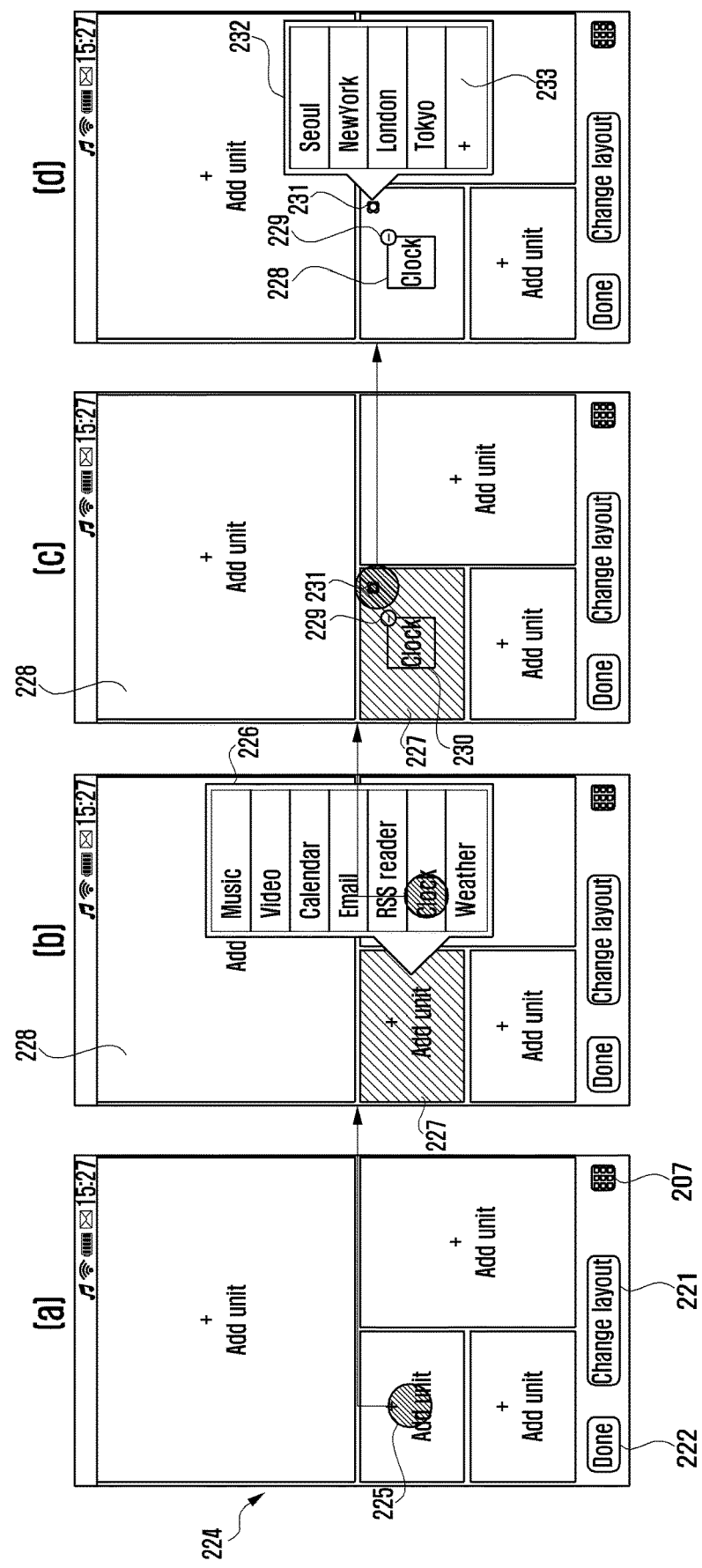
FIG. 4 is a view illustrating an exemplary procedure of creating a magazine according to an exemplary embodiment of the present invention.

FIG. 4 is a view illustrating exemplary operation of a procedure creating a magazine according to an exemplary embodiment of the present invention.

Referring now to FIG. 4, if a mapping event, for example, a tap at the touchscreen for a mapping button 225 (FIG. 4(*a*)) located at a first section 227 is sensed, the controller 180 controls the display unit 130 to display an application list 226. Concretely, the controller 180 selects at least one of a plurality of applications by referring to the size of the first section 227, constructs an application list 226 with the at least one selected application, and controls the display unit 130 to display the application list 226 (FIG. 4(*b*)). In other words, the controller 180 may not include an application having the size of an application execution screen larger than that of the first section in the list. For example, since a web browser may be mapped to a second section 228, it is included in the list. However, the web browser may not be mapped to a first section 227 smaller than the second section 228 (FIG. 4(*d*)). Here, the application list 226 may comprise of music, video, calendar, electronic mail, Really Simple Syndication (RSS) reader, clock, and weather.

If an application selection event, for example, tap at the touchscreen for a clock from an application list 226 is sensed, the controller 180 maps the clock to a first section 227 (FIG. 4(*c*)). Further, the controller 180 controls the display unit 130 to display a clock icon 230 and a removal button 229 preferably proximal or above the first section 227. In addition, when there are plural functions of an application, for example, a clock selected by a user, the controller 180 controls the display unit 130 to display a function button 231 on the first section 227.

If a mapping event, for example, tap for a function button 230 is sensed, the controller 180 controls the display unit 130 to display a related function list 232. More particularly, the function list 232 may consist of Seoul time, New York time, London time, Tokyo time, and city search button 233. If a function section event, for example, tap for Seoul time is sensed from the function list 232, the controller 180 maps a display function of the Seoul time to the first section 227.

According to the present invention, the controller 180 maps applications to other sections to create magazines, respectively. Next, when a tap for a creation end button 222 is sensed, the controller 180 stores the created magazine in the memory 140 and controls the display unit 130 to display the created magazine.

In the meantime, the controller 180 may change remaining regions except for regions to which applications are mapped to other layouts, respectively. This change of regions will be explained with reference to FIG. 5 in more detail.

Figure 5:
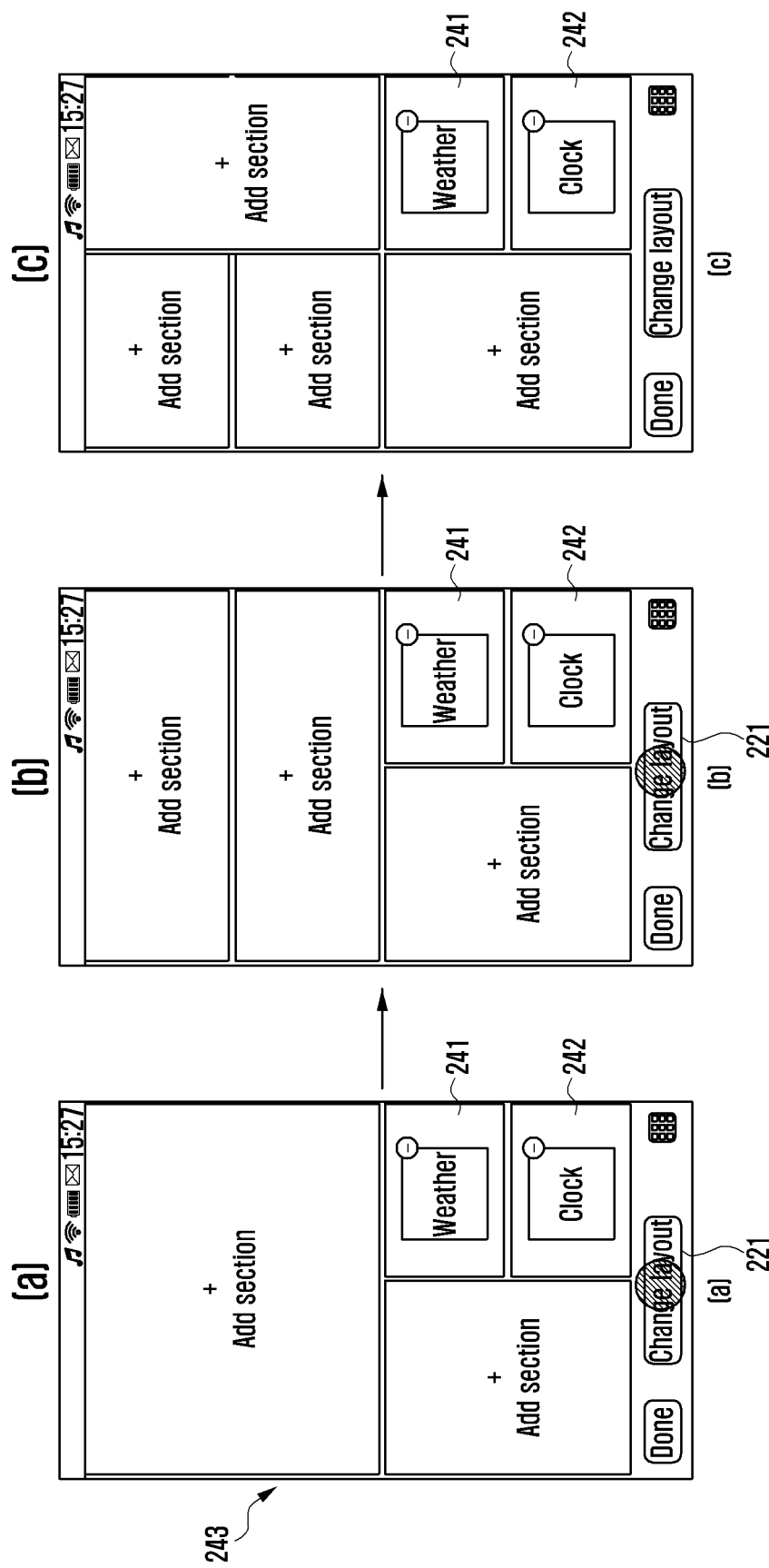
FIG. 5 is a view illustrating an exemplary layout change procedure according to another exemplary embodiment of the present invention.

FIG. 5 is a view illustrating a layout change procedure according to another exemplary embodiment of the present invention. Referring now to FIG. 5, for example, a controller 180 controls a display unit 130 to display a layout composed of a plurality of sections. Subsequently, as shown in FIG. 5(*a*), the controller 180 maps clock and weather applications to a first section 241 and a second section 242, respectively. Next, if tap is sensed for a layout change button 221 or flick & drop is sensed for a layout 243, the controller 180 changes remaining regions except for sections to which applications are mapped to sections having the different sizes and numbers as shown FIGS. 5(*b*) and 5(*c*).

Further, the controller 180 enables a user to optionally adjust the sizes of respective sections. This adjustment will be described with reference to FIG. 6 and FIG. 7 in detail.

Figure 6:
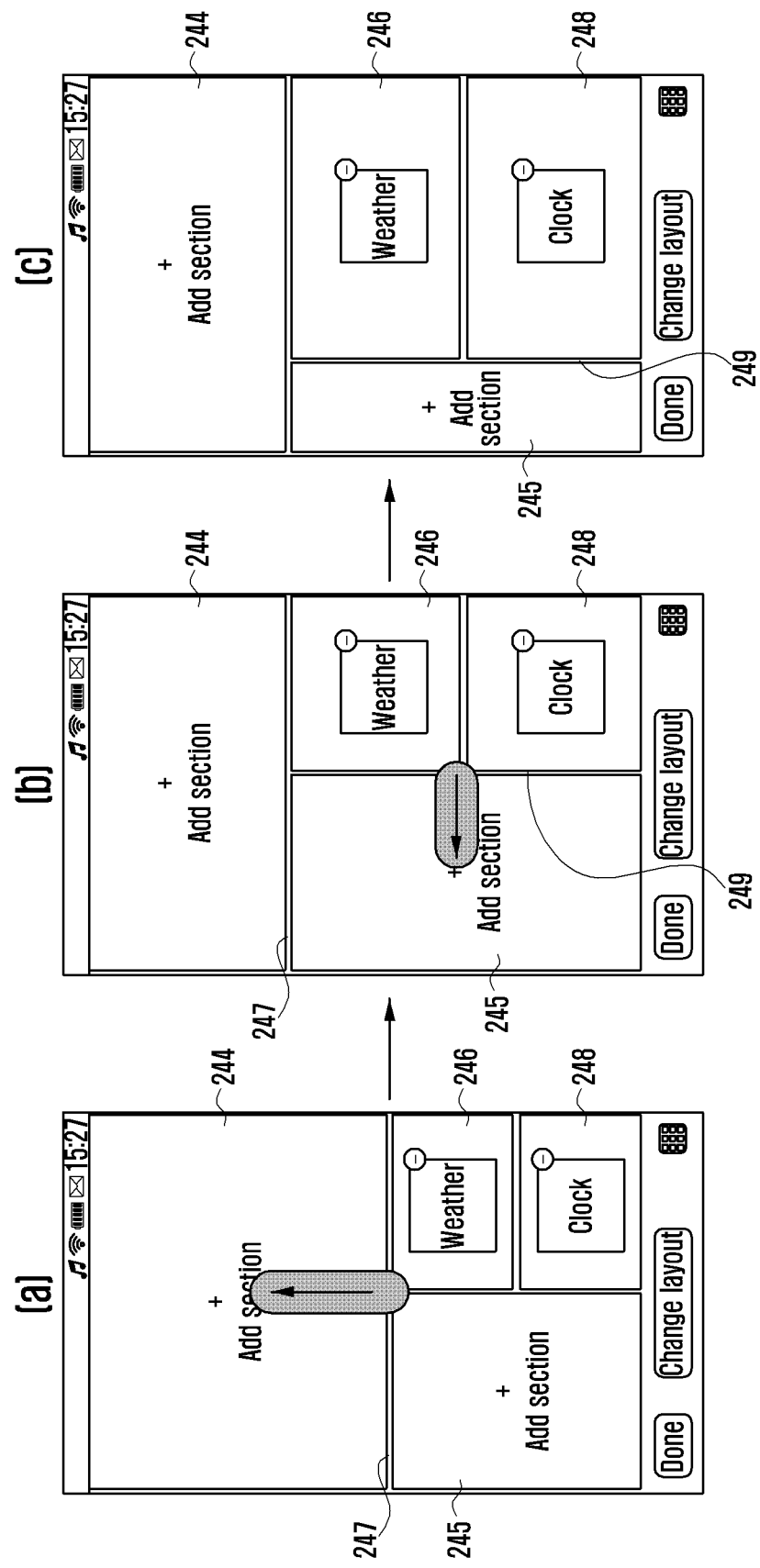
FIG. 6 is a view illustrating an exemplary layout change procedure according to still another exemplary embodiment of the present invention.

FIG. 6 is a view illustrating a layout change procedure according to still another exemplary embodiment of the present invention. As shown in FIG. 6(*a*), if a section control event is sensed, for example, drag to a left side from a first boundary 247 between a first section 244 and second and third sections 245 and 246 is sensed, the controller 180 reduces the size of the first section 244 and relatively increase the sizes of remaining sections 245, 246, and 248 as shown in FIG. 6(*b*). Further, a drag to a left side from a second boundary 249 between the second section 245 and third and fourth sections 246 and 248 is sensed, the controller 180 reduces the size of the second section 245 and increases the sizes of remaining sections 246 and 248, as shown in FIG. 6(*c*). At this time, the controller 180 maintains the size of the first section 244 not contacting the second boundary 249 at it is. As illustrated above, the controller 180 moves boundaries to control the sizes of sections contacting the boundaries. Unlike the aforementioned control of size of a plurality of sections, the controller 180 may control the size of only one section to be described below.

Figure 7:
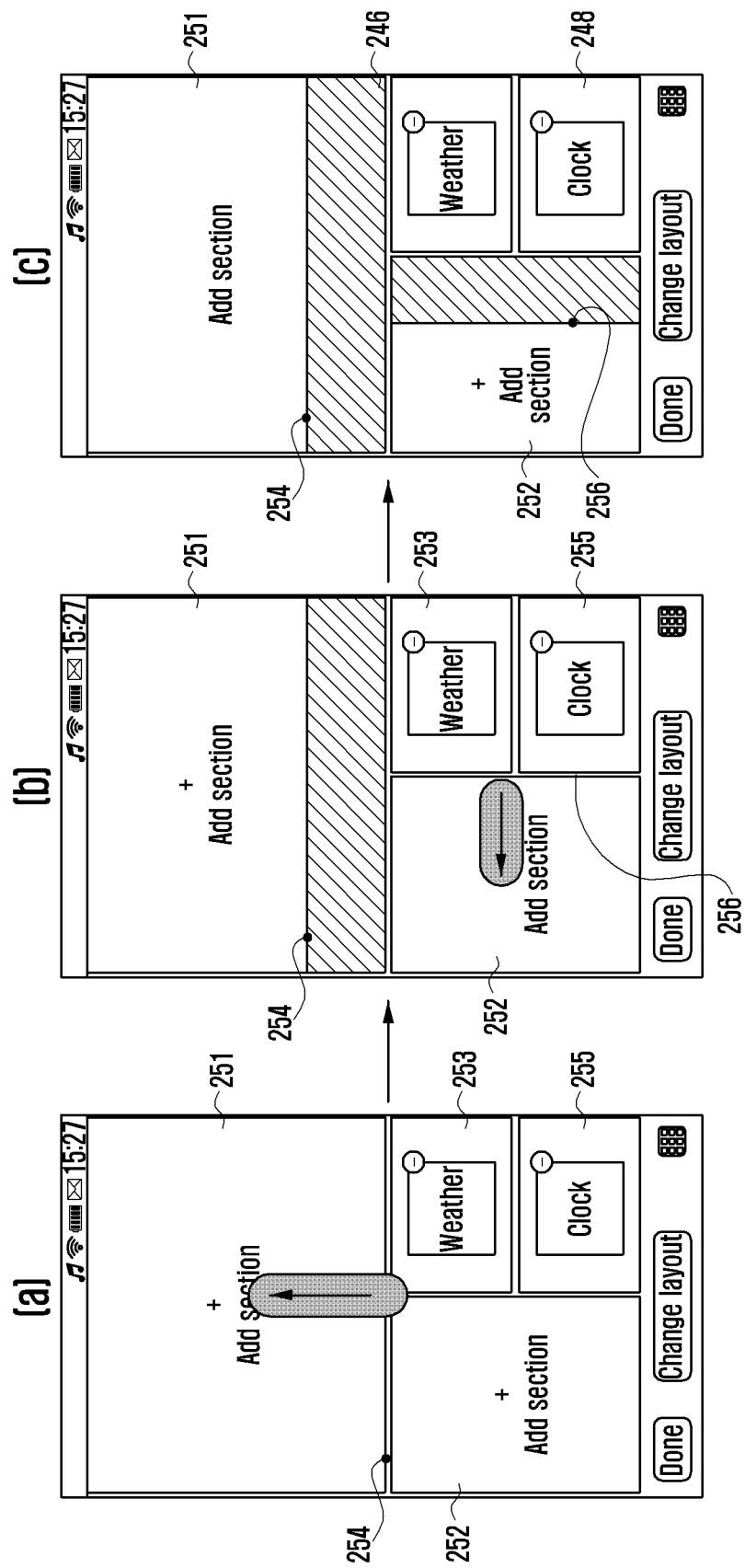
FIG. 7 is a view illustrating an exemplary layout change procedure according to yet another exemplary embodiment of the present invention.

FIG. 7 is a view illustrating a layout change procedure according to yet another exemplary embodiment of the present invention. As shown in FIG. 7(*a*), if drag is sensed to an upper side from a first boundary 254 between the first section 251 and second and third sections 252 and 253, the controller 180 reduces the size of the first section 244 as shown in FIG. 7(*b*). At this time, the controller 180 maintains the sizes of remaining sections 252, 253, and 255 at is. Further, if a user drags it downwards from the first boundary 254, the controller 180 again increases the size of the first section 244.

Additionally, if drag to a left side from a second section 256 between the second section 252 and third and fourth sections 253 and 255 is sensed, the controller 180 reduces the size of the second section 252 as shown in FIG. 7(*c*). In the same manner, the sizes of remaining sections maintain as is. Meanwhile, if the user drags it to a right side from the second boundary 256, the controller 180 again increases the size of the second section 252.

Figure 8:
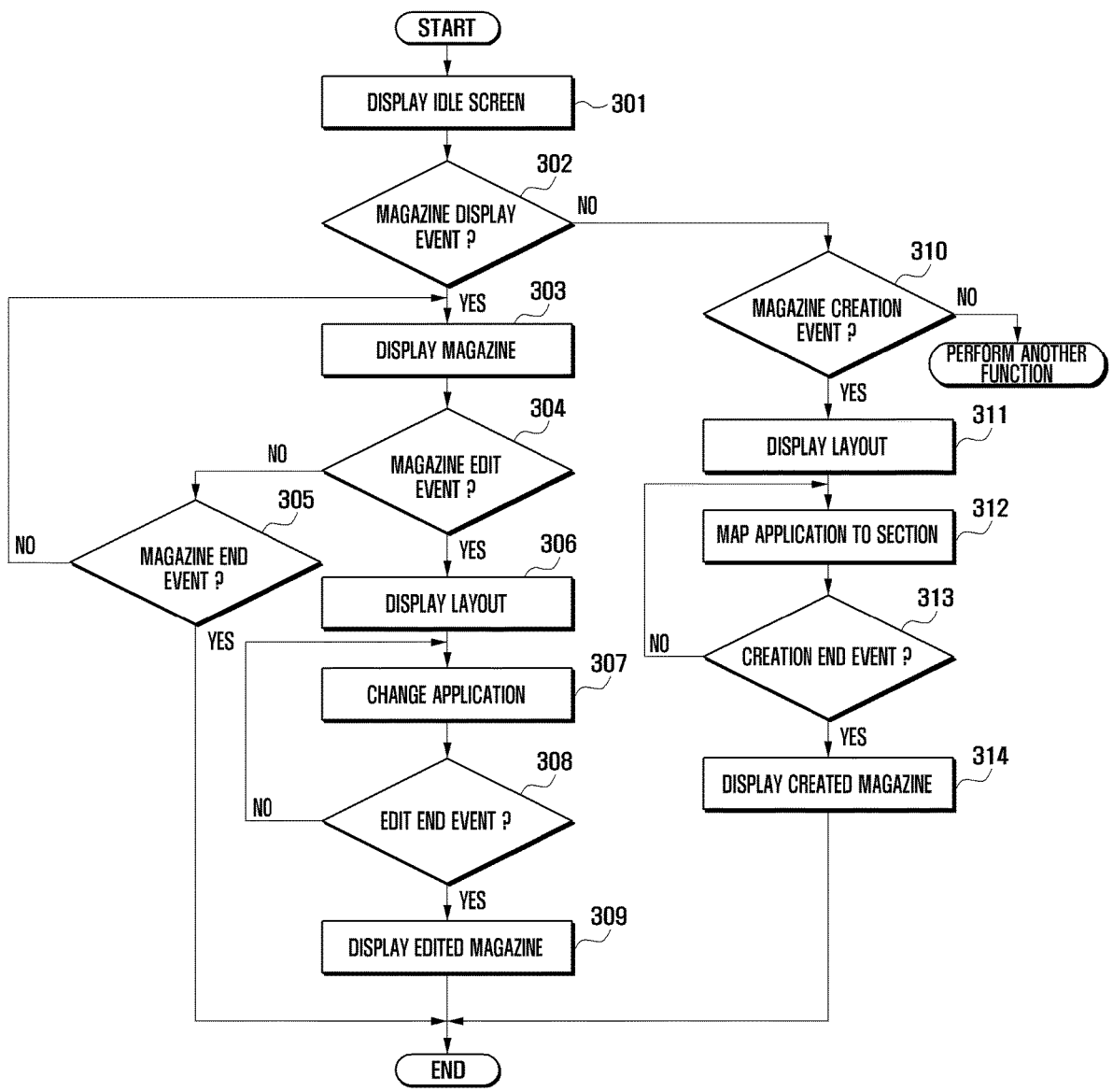
FIG. 8 is a flowchart illustrating exemplary operation of a method for controlling a screen of a mobile terminal according to an exemplary embodiment of the present invention.

FIG. 8 is a flowchart illustrating exemplary operation of a method for controlling a screen of a mobile terminal according to an exemplary embodiment of the present invention.

Referring now to FIG. 8, at (301) a controller 180 controls a display unit 130 to display an idle screen, for example, a home screen.

At (302(, if a magazine display event is sensed, then at (303), the controller 180 controls the display unit 130 to display a magazine instead of the home screen. Meanwhile, if at (303) a magazine change event is sensed, the controller 180 controls the display unit 130 to display another magazine.

Next, at (304) if a magazine edit event is sensed while displaying the magazine, the process proceeds to step 306. If a magazine edit event is not sense at (304), then it is determined by the controller at (305) whether a magazine end event is sensed while displaying the magazine, and the controller 180 terminates display of the magazine and instead controls the display unit 130 to display a home screen.

The controller 180 controls the display unit 130 to display a layout of a displayed magazine (306). The controller 180 changes an application mapped to a section to another application to edit the magazine (307). Meanwhile, the controller 180 may change a section from which mapping of an application is released by a user to another section as illustrated with reference to FIG. 5, and then map an application to the changed section. Further, the controller 180 may control the size of the section as illustrated in FIG. 6 and FIG. 7. If an edit end event is sensed (308), the controller 180 proceeds to step 309. The controller 180 updates the edited magazine in a memory 140 and controls the display unit 130 to display the edited magazine (309).

If a magazine creation event is sensed while displaying a home screen (310), the controller 180 proceeds to step 311. The controller 180 controls the display unit 130 to display a layout (311) and then the process proceeds to step 312. If a layout change event is sensed, the controller 180 controls the display unit 130 to display another layout (311). The controller 180 maps applications to a plurality of sections in a one-to-one correspondence, respectively. Further, the controller 180 may change it to another layout in remaining geometric regions of the display except for a geometric region of the display to which an application is mapped as illustrated in FIG. 5. As illustrated in FIG. 6 and FIG. 7, the controller 180 may control the size of a section (312). If the creation end event is sensed (313), the controller 180 proceeds to step 314. The controller 180 controls the display unit 130 to display the created magazine (314).

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although a method for controlling a screen of a mobile terminal according to exemplary embodiments of the present invention has been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A mobile terminal comprising:
a processor;
a RF communication unit coupled to the processor;
a touch screen coupled to the processor; and
a memory coupled to the processor;
wherein the processor is configured to:
control the touch screen to display a visual arrangement that includes a plurality of sections;
based on detecting an input, display a list of applications which are insertable into a specified section of the plurality of sections;
based on detecting a first touch input selecting a first application from the list of applications, associate the first application with a first section of the plurality of sections and store information related to the association in the memory;
after associating the first application with the first section, control the touch screen to update the visual arrangement including displaying a first image representing the first application in the first section, wherein the visual arrangement includes at least a second image related to an execution screen of at least one other application in a second section of the plurality of sections, such that the first image and the second image are displayed simultaneously;
after displaying the first image in the first section, detect a second touch input selecting the first image, and display a list including an item associated with the first application based on the second touch input; and
after detecting selection of the item, display an execution screen of the first application in the first section in replacement of the first image.

2. The mobile terminal of claim 1, wherein the execution screen of the first application and the execution screen of the at least one other application comprise at least one widget, the processor further configured to:
display a menu item over a portion of the first image; and
in response to detecting a third touch input selecting the menu item, remove the first image from display in the specified section.

3. The mobile terminal of claim 1, wherein the first image representing the first application is maintained on the touch screen after detecting the second touch input, while the list including the item is displayed, until the item is selected and the first image is removed.

4. The mobile terminal of claim 1, further comprising a key input unit coupled to the processor.

5. The mobile terminal of claim 1, wherein the processor is further configured to:
control the touch screen to display an application list when the specified section is selected;
associate a second application selected from the application list with the specified section; and
control the touch screen to display in the specified section a second application icon corresponding to the second application.

6. The mobile terminal of claim 1, wherein the processor is further configured to control the touch screen to display the visual arrangement when a visual arrangement display event is detected while displaying a home screen.

7. The mobile terminal of claim 1, wherein the processor is further configured to control the touch screen to display the visual arrangement when a lock release event is detected.

8. The mobile terminal of claim 1, wherein the processor is further configured to:
control the touch screen to display an icon indicating the first application; and
control, in response to detecting a touch gesture on the displayed icon, control the touch screen to display a representation of the first application in the specified section.

9. A method in an electronic device, the method comprising:

displaying, by a touch screen, a visual arrangement that includes a plurality of sections;

based on detecting an input, controlling the touch screen to display a list of applications which are insertable into a first section of the plurality of sections;

based on detecting a first touch input selecting a first application from the list of applications, associating by a processor the first application with the first section of the plurality of sections -and storing information related to the association;

after associating the first application with the first section, controlling the touch screen to update the visual arrangement including displaying a first image representing the first application in the first section, wherein the visual arrangement includes at least a second image related to an execution screen of at least one other application in a second section of the plurality of sections, such that the first image and the second image are displayed simultaneously;

after displaying the first image in the first section, detecting a second touch input selecting the first image, and displaying a list including an item associated with the first application based on the second touch input; and after detecting selection of the item, displaying an execution screen of the first application within the first section that replaces the first image.

10. The method of claim 9, wherein the visual arrangement includes a user-specified layout.

11. The method of claim 9, wherein displaying the visual arrangement comprises controlling a size of at least one of the plurality of sections when a section control event is sensed.

12. The method of claim 9, wherein the associating comprises:
displaying by the touch screen an application list; and
receiving, via the application list, a selection of the first application.

13. The method of claim 12, wherein the first image representing the first application is maintained on display after detecting the second touch input, while the list including the item is displayed, until the item is selected and the first image is removed.

14. The method of claim 9, wherein the associating comprises generating a list of applications and receiving, via the list of applications, a selection of the first application.

15. The method of claim 9, further comprising replacing the visual arrangement with another visual arrangement when a visual arrangement change event is sensed by the processor.

16. The method of claim 9, further comprising associating a second application to the first section when a visual arrangement edit event is sensed by the processor.

17. The method of claim 9, further comprising:
displaying an application list when the first section is selected;
associating a second application selected from the application list to the first section; and
displaying in the first section a second application icon corresponding to the second application.

18. The method of claim 9, wherein the execution screen of the first application and the execution screen of the at least one other application comprise at least one widget, the method further comprising:
displaying a menu item over a portion of the first image; and
in response to detecting a third touch input selecting the menu item, removing the first image from display in the first section.

19. The method of claim 9, wherein the associating further comprises:
displaying, by the touch screen, an icon indicating the first application;
detecting a touch gesture on the displayed icon; and
in response to the detecting, associating the first application with the first section.

\* \* \* \* \*